US008885567B2

(12) United States Patent
Luo et al.

(10) Patent No.: US 8,885,567 B2
(45) Date of Patent: Nov. 11, 2014

(54) REDUCING COMPLEXITY FOR IMPLEMENTING INTERFERENCE CANCELLATION APPLIED TO PHYSICAL CHANNELS OF A WIRELESS NETWORK

(71) Applicant: QUALCOMM Incorporated, San Diego, CA (US)

(72) Inventors: Tao Luo, San Diego, CA (US); Yongbin Wei, San Diego, CA (US); Durga Prasad Malladi, San Diego, CA (US); Taesang Yoo, San Diego, CA (US); Lu Zhao, Nuremberg (DE); Myriam Rajih, Nuremberg (DE); Hendrik Schoeneich, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 13/665,302

(22) Filed: Oct. 31, 2012

(65) Prior Publication Data
US 2013/0107805 A1     May 2, 2013

Related U.S. Application Data

(60) Provisional application No. 61/554,881, filed on Nov. 2, 2011.

(51) Int. Cl.
*H04L 12/28* (2006.01)
*H04L 25/03* (2006.01)
*H04J 11/00* (2006.01)

(52) U.S. Cl.
CPC .... H04L 25/03891 (2013.01); H04L 25/03993 (2013.01); H04J 11/0023 (2013.01)
USPC .......................................................... 370/328

(58) Field of Classification Search
CPC .................. H04L 25/03993; H04L 25/03891; H04J 11/0023
See application file for complete search history.

(56) References Cited

U.S. PATENT DOCUMENTS

| 6,470,047 | B1 | 10/2002 | Kleinerman et al. | |
|---|---|---|---|---|
| 8,126,099 | B2 | 2/2012 | Wu et al. | |
| 2007/0072551 | A1* | 3/2007 | Pajukoski et al. | 455/63.1 |
| 2009/0262872 | A1 | 10/2009 | Prasad et al. | |
| 2010/0118856 | A1* | 5/2010 | Krishnamurthy et al. | 370/342 |
| 2010/0232535 | A1 | 9/2010 | Yue et al. | |
| 2010/0309861 | A1* | 12/2010 | Gorokhov et al. | 370/329 |

FOREIGN PATENT DOCUMENTS

GB        2299909 A     10/1996

OTHER PUBLICATIONS

International Search Report and Written Opinion—PCT/US2012/063084—ISA/EPO—Feb. 15, 2013.

(Continued)

*Primary Examiner* — John Blanton
(74) *Attorney, Agent, or Firm* — Seyfarth Shaw LLP

(57) ABSTRACT

A system for wireless communication reduces implementation complexity for symbol level interference cancellation as applied to physical control and data channels, such as the physical downlink shared channel (PDSCH) and physical downlink control channel (PDCCH). A user equipment (UE) categorizes tones of a signal into tone groups. A different noise whitening matrix is applied to each tone group for demodulation and decoding of the signal.

16 Claims, 10 Drawing Sheets

(56) References Cited

OTHER PUBLICATIONS

Wuebben D., et al., "Low Complexity Successive Interference Cancellation for MIMO-OFDM Systems," European Transactions on Telecommunications, Wiley and Sons, Chichester, GB, vol. 18 (5), Aug. 1, 2007, pp. 457-466, XP001506674, ISSN: 1124-318X, DOI: 10.1002/ETT.1886.

Nangare N., et al., "Performance of BCJR-DFE Detectors Over Recording Channels Using Pattern-Dependent Noise Prediction," IEEE Transactions on Magnetics, vol. 41 (10), Oct. 2005, pp. 2971-2973.

\* cited by examiner

REDUCING COMPLEXITY FOR IMPLEMENTING INTERFERENCE CANCELLATION APPLIED TO PHYSICAL CHANNELS OF A WIRELESS NETWORK

CROSS-REFERENCE TO RELATED APPLICATION

This application claims the benefit under 35 U.S.C. §119 (e) to U.S. Provisional Patent Application No. 61/554,881 entitled "REDUCING COMPLEXITY FOR IMPLEMENTING INTERFERENCE CANCELLATION APPLIED TO PHYSICAL CHANNELS OF A WIRELESS NETWORK," filed on Nov. 2, 2011, the disclosure of which is expressly incorporated by reference herein in its entirety.

BACKGROUND

1. Field

Aspects of the present disclosure relate generally to wireless communication systems, and more particularly to applying interference cancellation to physical control and data channels such as the physical downlink shared channel (PDSCH) and physical downlink control channel (PDCCH).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In one aspect, a method of wireless communication is disclosed. The method includes performing interference cancellation on a received signal. The tones of the received signal are categorized into tone groups. A different noise whitening matrix is applied to each tone group for demodulation and decoding of the signal.

Another aspect discloses wireless communication having a memory and at least one processor coupled to the memory. The processor(s) is configured to perform interference cancellation on a received signal. The processor(s) is also configured to categorize tones of the signal into tone groups. The processor(s) is configured to apply a different noise whitening matrix to each tone group for demodulation and decoding of the signal.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of performing interference cancellation on a received signal. The program code also causes the processor(s) to categorize tones of the signal into tone groups and then apply a different noise whitening matrix to each tone group for demodulation and decoding of the signal.

Another aspect discloses an apparatus including means for performing interference cancellation on a received signal. The apparatus also includes means for categorizing tones of a signal into tone groups. The apparatus also includes means for applying a different noise whitening matrix to each tone group for demodulation and decoding of the signal.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

Figure 1:
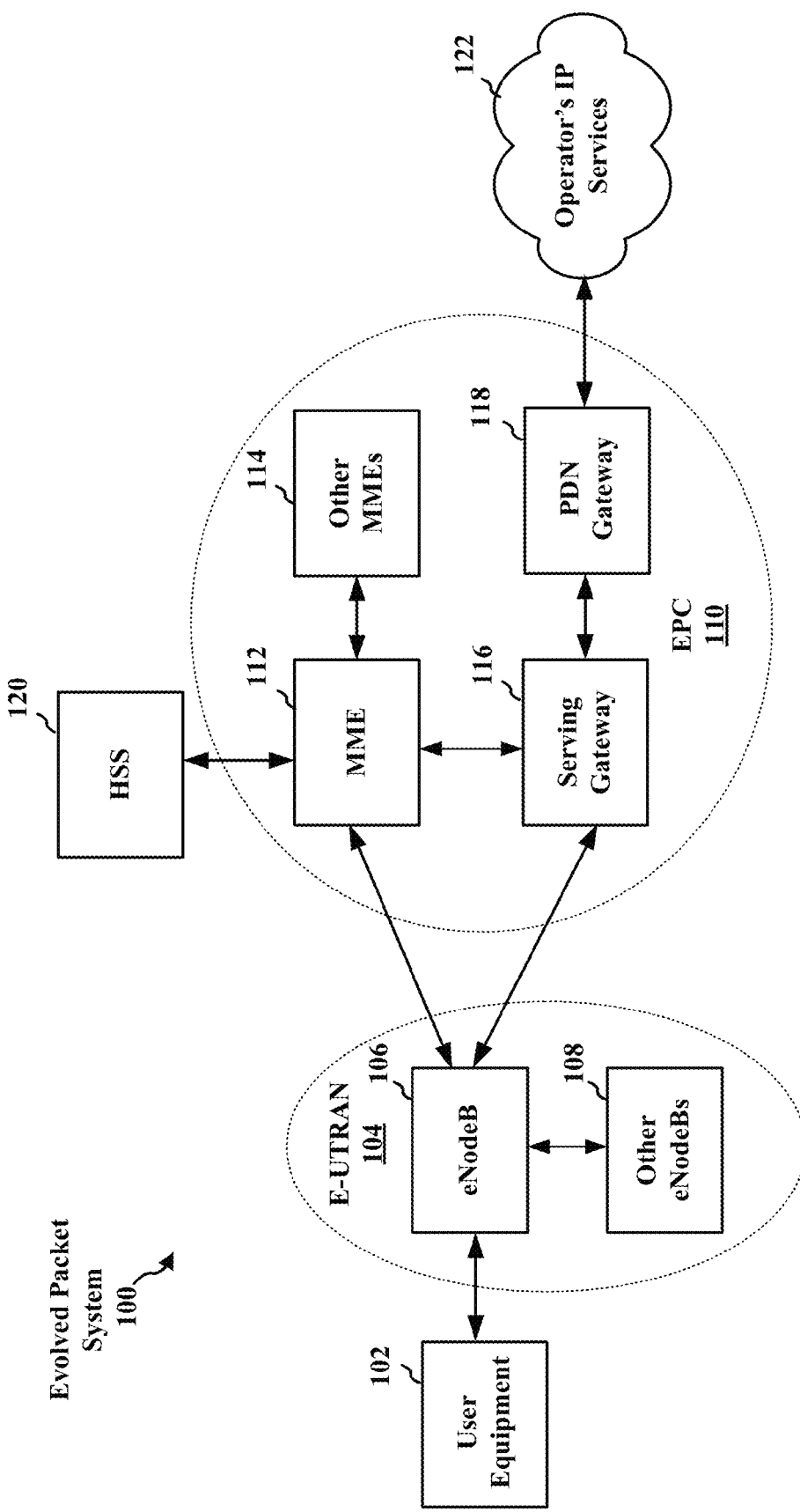
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved NodeB (eNB) 106 and other eNodeBs 108. The eNodeB 106 provides user and control plane protocol terminations toward the UE 102. The eNodeB 106 may be connected to the other eNodeBs 108 via an X2 interface (e.g., backhaul). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
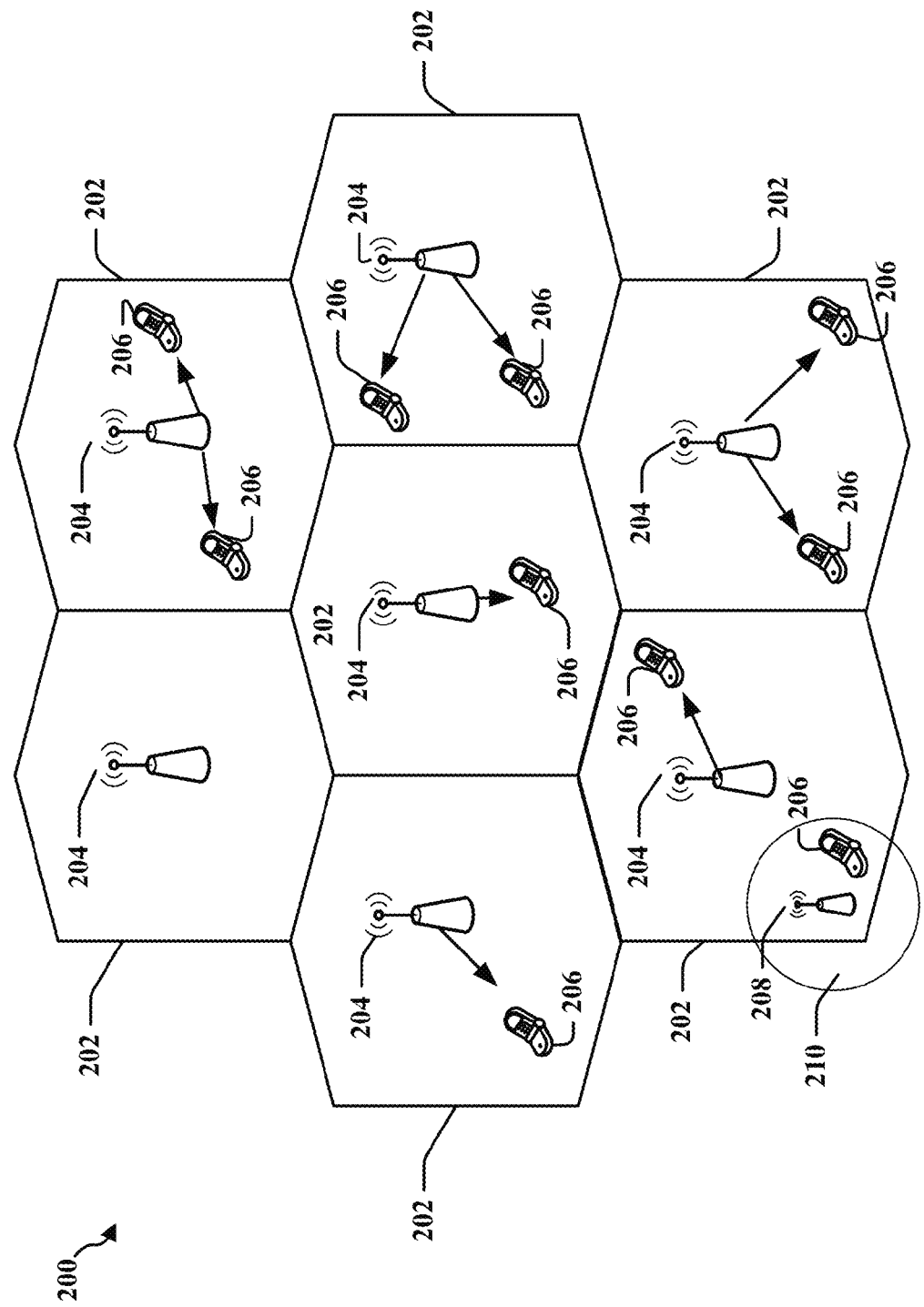
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be referred to as a remote radio head (RRH). The lower power class eNodeB 208 may be a femto cell (e.g., home eNodeB (HeNB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
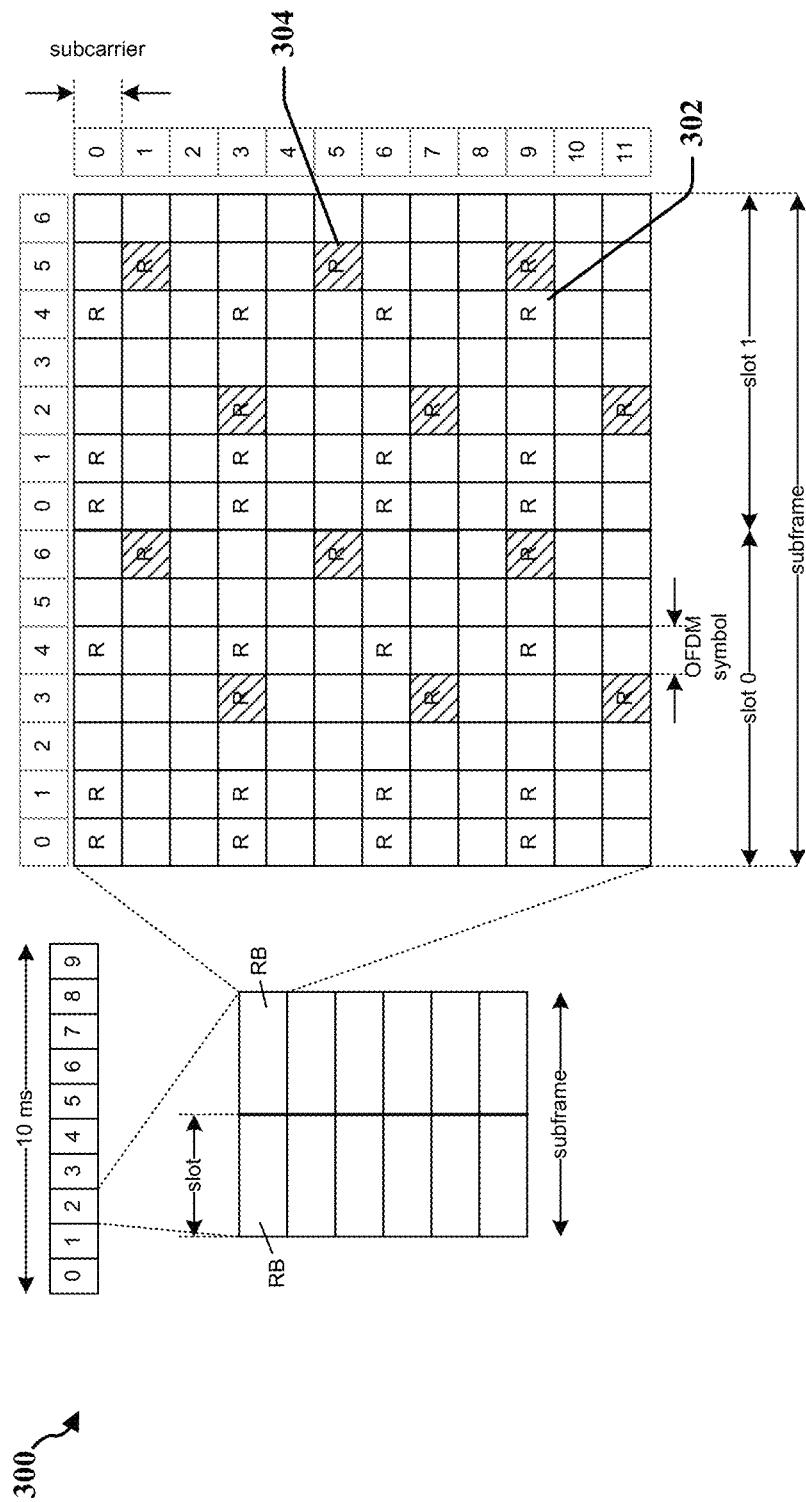
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
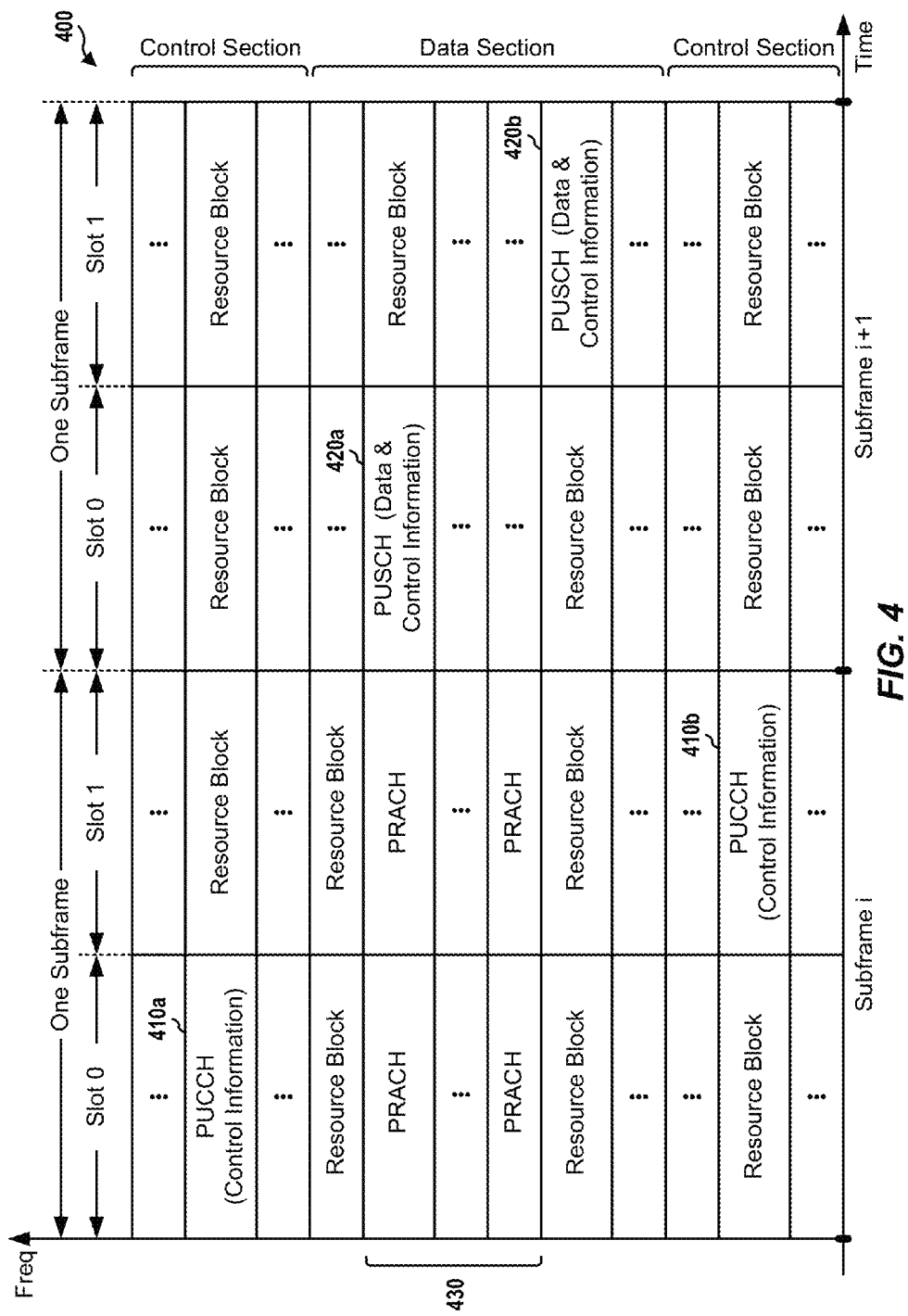
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
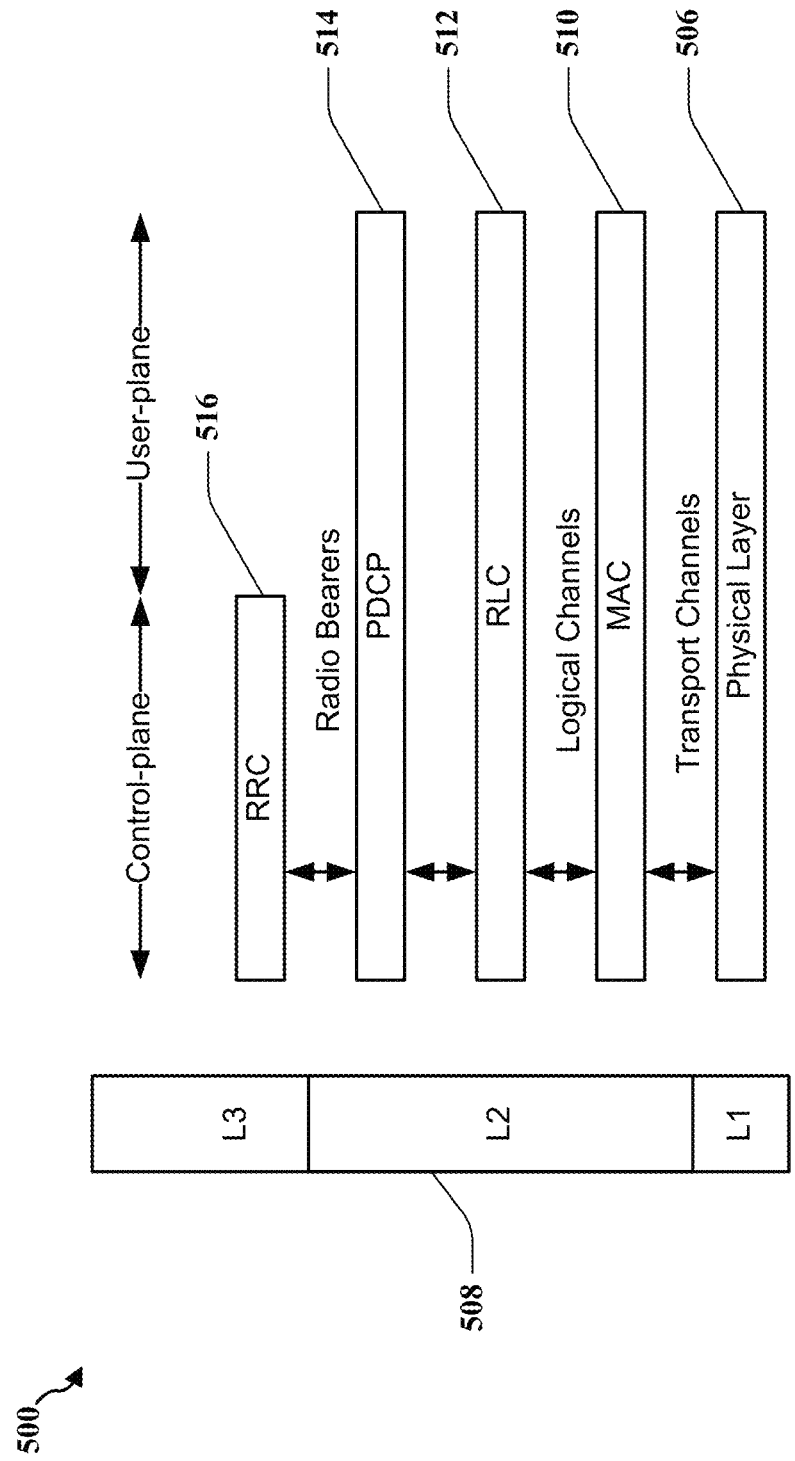
FIG. 5 is a diagram illustrating an example of a radio protocol architecture for the user and control plane.

FIG. 5 is a diagram 500 illustrating an example of a radio protocol architecture for the user and control planes in LTE.

The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
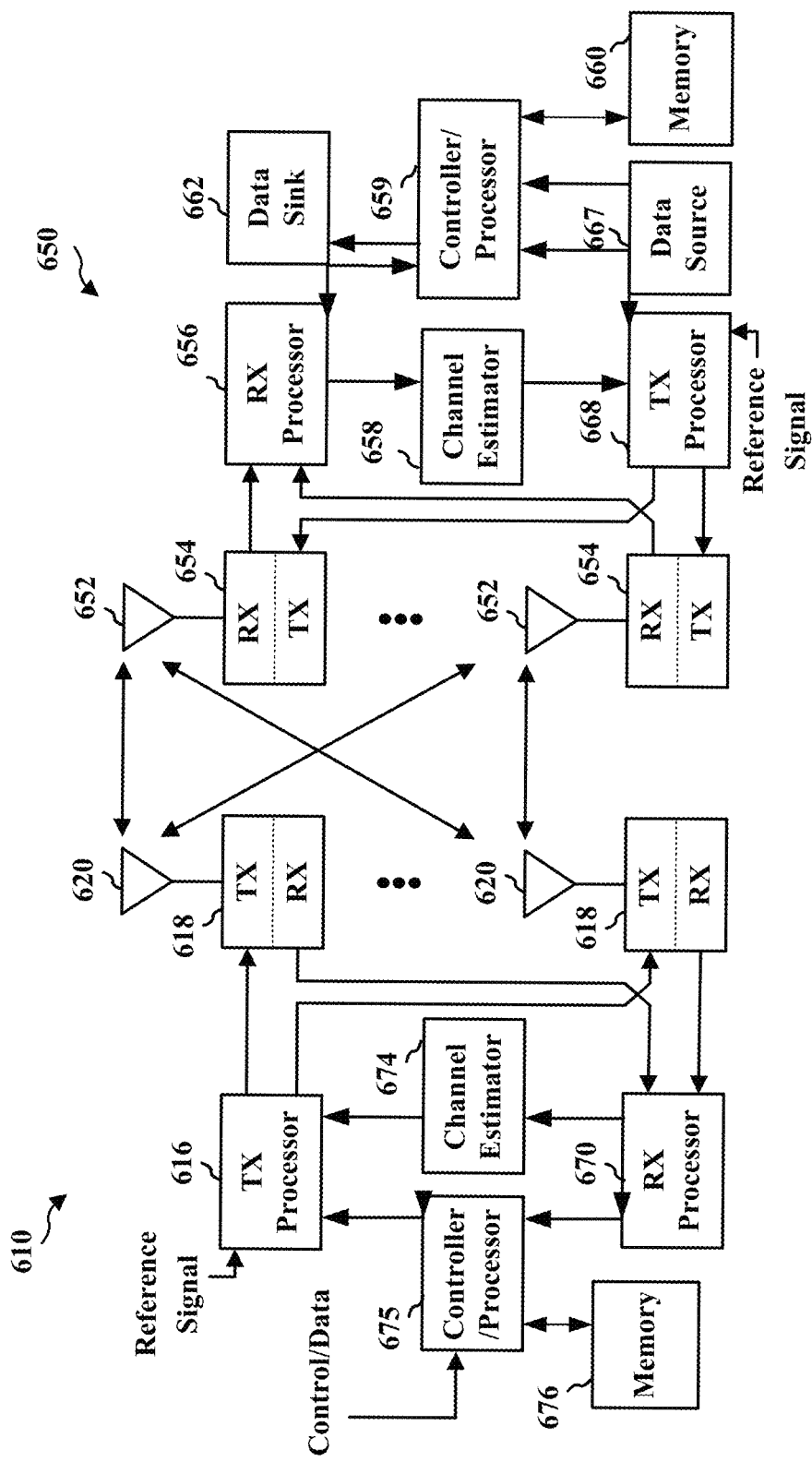
FIG. 6 is a diagram illustrating an example of an evolved Node B and user equipment in an access network.

FIG. 6 is a block diagram of an eNodeB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink (UL), a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
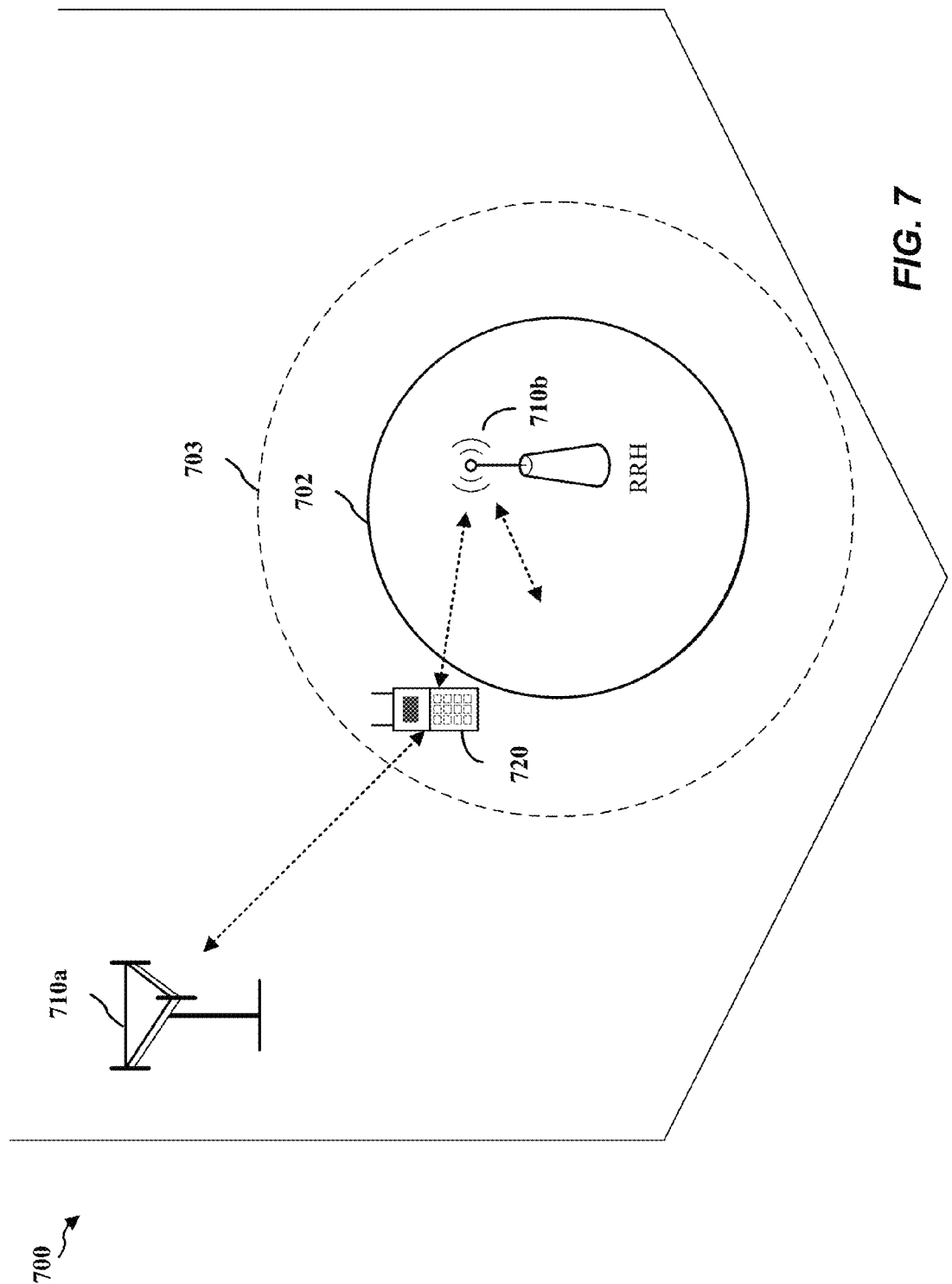
FIG. 7 is a diagram illustrating a range expanded cellular region in a heterogeneous network.

FIG. 7 is a diagram 700 illustrating a range expanded cellular region in a heterogeneous network. A lower power class eNodeB, such as the RRH 710b, may have a range expanded cellular region 703 that is expanded from the cellular region 702 through inter-cell interference coordination between the RRH 710b and the macro eNodeB 710a and through interference cancelation performed by the UE 720. In enhanced inter-cell interference coordination, the RRH 710b receives information from the macro eNodeB 710a about an interference condition of the UE 720. The information allows the RRH 710b to serve the UE 720 in the range expanded cellular region 703 and to accept a handoff of the UE 720 from the macro eNodeB 710a as the UE 720 enters the range expanded cellular region 703. Interference cancellation techniques can improve communications in the range expanded cellular region 703, and elsewhere.

In one aspect of the present disclosure, interference cancellation (IC) is applied to improve the spectral efficiency in LTE/LTE-A downlink communications. Interference cancellation may be applied to all physical channels and signals (e.g., PSS, SSS, PBCH, CRS, DRS, CSI-RS, PCFICH, PHICH, PDCCH, PDSCH, etc). With respect to downlink data (i.e., physical downlink shared channel (PDSCH)) and downlink control (i.e., physical downlink control channel (PDCCH)) interference cancellation, codeword level interference cancellation (CWIC) and symbol level interference cancellation (SLIC) are possible. In codeword level interference cancellation, the UE decodes the interfering data from the received interfering signal and cancels the interfering data. In symbol level interference cancellation, the UE detects the interfering modulation symbols from the received interfering signal and cancels the interfering symbols. No decoding occurs with symbol level interference cancellation, only demodulation. The symbol level interference cancellation has lower complexity than codeword level interference cancellation, but generally performs worse than the codeword level interference cancellation. One aspect of the present disclosure is directed to reducing the implementation complexity for symbol level interference cancellation and also codeword level interference cancellation.

A UE may perform noise whitening operations before performing minimum mean square error (MMSE) equalization (i.e., prior to demodulation). In the noise whitening operation, the noise seen by the signal is estimated. If no interference cancellation occurs, all tones in a resource block are subjected to similar noise level, and therefore a single noise whitening operation may be used for the resource block. For symbol level interference cancellation, the noise seen by each tone may vary because the symbol detection and cancellation are imperfect and their quality varies across tones. To account for the significant variability of noise per tone, in one aspect, noise estimation is applied for each tone. Additionally, noise whitening is then also applied for each-tone. Application for each tone increases the complexity of operation.

One aspect of the disclosure reduces the implementation complexity of data channel (e.g., PDSCH) and control channel (e.g., PDCCH, PCFICH, PHICH, etc.) interference cancellation. In particular, the UE calculates noise estimates for each tone after performing interference cancellation. The UE then organizes the tones into groups. For example, the UE may group tones based on noise estimation results (after interference cancellation). In other words, tones having noise estimation results that are similar in strength may be grouped together. For example, if one resource block has tones with near perfect interference cancellation (i.e., almost no noise) and tones with poor interference cancellation (i.e., strong noise), then the UE creates two groups.

Additionally, time/frequency location of tones may be factors used to group tones. For example, if one resource block includes three control symbols and 11 data symbols, the grouping may be as follows: First group—three control symbols; Second group—first three data symbols; Third group—second three data symbols; Last group—remaining data symbols. The time frequency grouping could be in addition to or independent from the noise estimate grouping.

Further, the UE may group tones based on the soft log-likelihood ratio (LLR) values of each tone. Similar to the time/frequency grouping, the LLR grouping can be in addition to or independent from the noise estimate grouping. Moreover, the LLR grouping can be in addition to or independent from the time/frequency grouping.

After the tones have been grouped, the UE applies a noise whitening matrix based on a particular group type. The same noise whitening is applied to all tones within one particular group.

Figure 8:
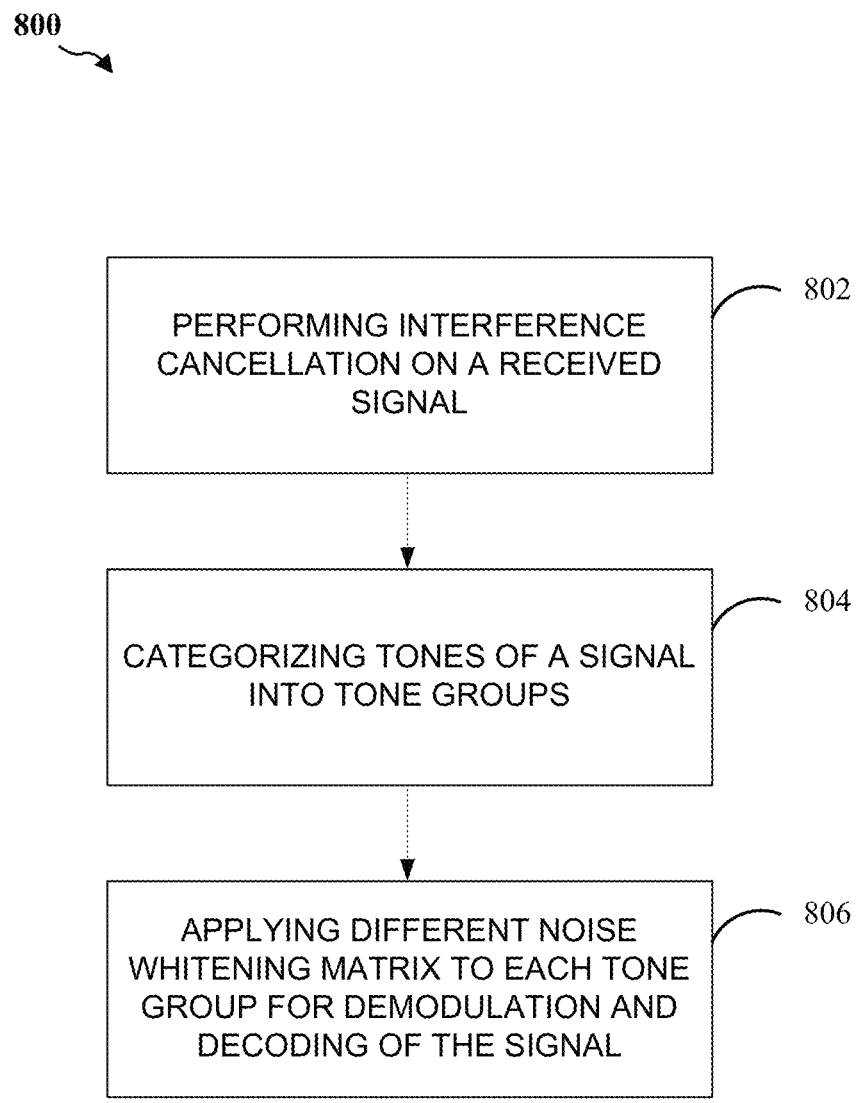
FIG. 8 is a flow chart of a method of wireless communication.

FIG. 8 illustrates a method 800 for interference cancellation. The method may be performed by a UE. At block 802, the UE performs interference cancellation on a received signal. Next, in block 804, the UE categorizes the tones of the received signal into tone groups. At block 806, the UE applies a different noise whitening matrix to each group of tone group for demodulation and decoding of the signal.

Figure 9:
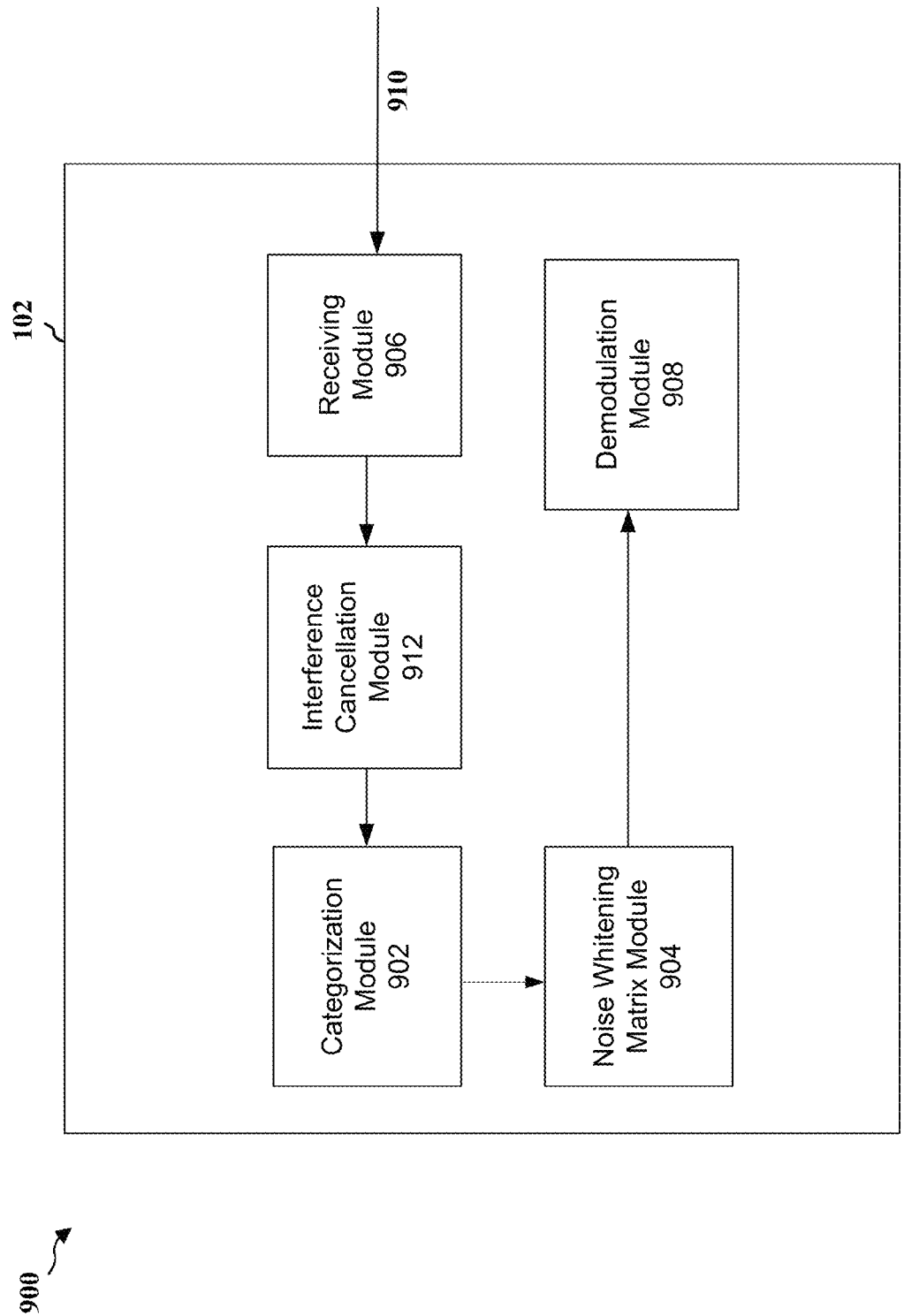
FIG. 9 is a conceptual data flow diagram illustrating the data flow between different modules/means/components in an exemplary apparatus.

FIG. 9 is a conceptual data flow diagram 900 illustrating a data flow between different modules/means/components in an exemplary apparatus 102. A receiving module 906 receives tones of a signal 910. The signal 910 is passed to the interference module 912 where interference cancellation is performed on the signal 910. The signal 910 is then passed to the categorization module 902 which categorizes the tones into groups. The categorizing module 902 transmits the results to a noise whitening matrix module 904 that applies a different noise whitening matrix module to each group of tones. The noise whitening matrix is then passed to a demodulation module for demodulation, and eventual decoding.

The apparatus may include additional modules that perform each of the blocks of the process in the aforementioned flow chart of FIG. 8. As such, each step in the aforementioned flow chart of FIG. 8 may be performed by a module and the apparatus may include one or more of those modules. The modules may be one or more hardware components specifically configured to carry out the stated processes, implemented by a processor configured to perform the stated processes, stored within a computer-readable medium for implementation by a processor, or some combination thereof.

Figure 10:
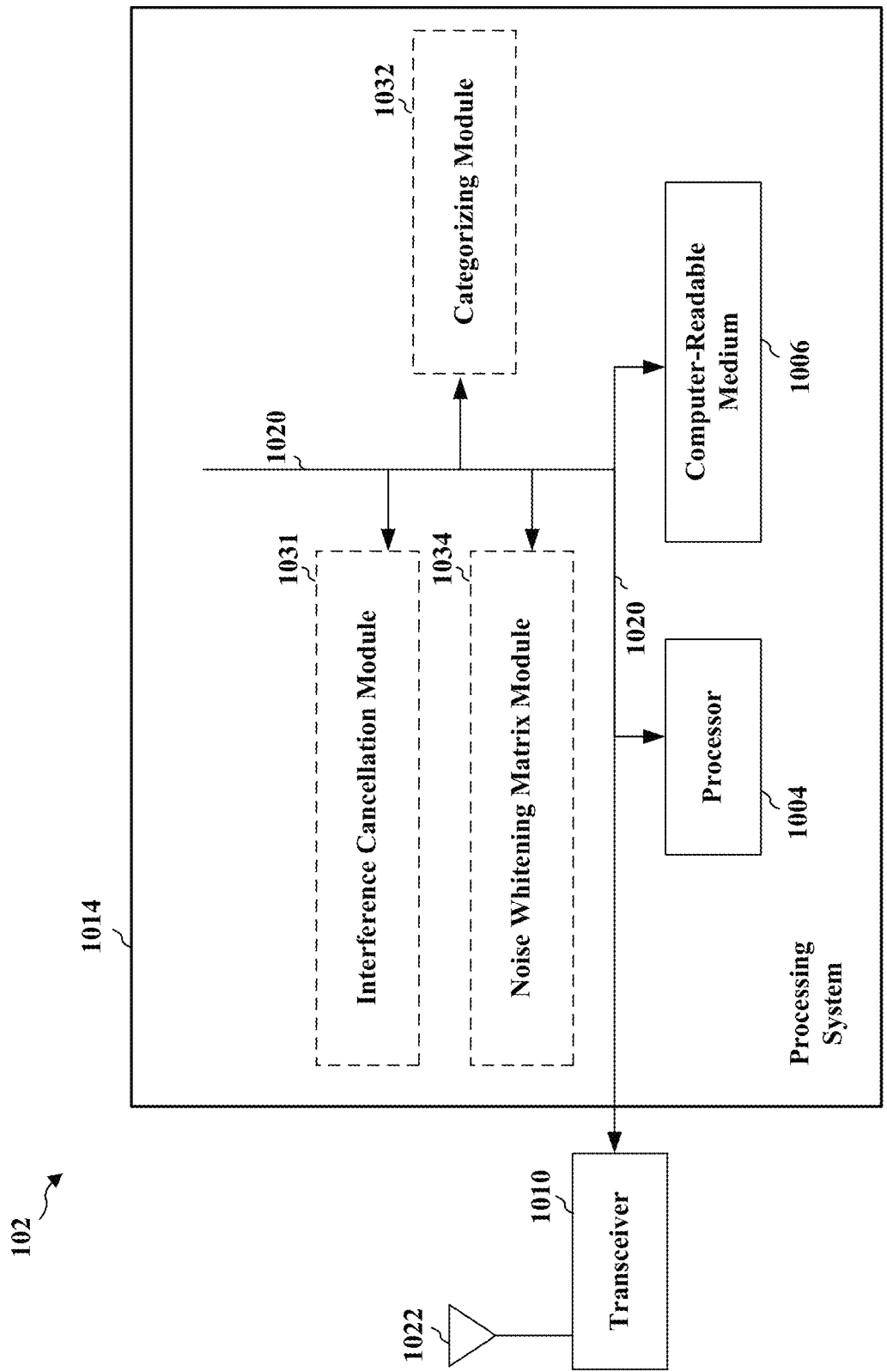
FIG. 10 is a diagram illustrating an example of a hardware implementation for an apparatus employing a processing system.

FIG. 10 is a diagram illustrating an example of a hardware implementation for an apparatus 102 employing a processing system 1014. The processing system 1014 may be implemented with a bus architecture, represented generally by the bus 1020. The bus 1020 may include any number of interconnecting buses and bridges depending on the specific application of the processing system 1014 and the overall design constraints. The bus 1020 links together various circuits including one or more processors and/or hardware modules, represented by the processor 1004, the modules 1031, 1032, 1034 and the computer-readable medium 1006. The bus 1020 may also link various other circuits such as timing sources, peripherals, voltage regulators, and power management circuits, which are well known in the art, and therefore, will not be described any further.

The apparatus includes a processing system 1014 coupled to a transceiver 1010. The transceiver 1010 is coupled to one or more antennas 1022. The transceiver 1010 provides a means for communicating with various other apparatus over a transmission medium. The processing system 1014 includes a processor 1004 coupled to a computer-readable medium 1006. The processor 1004 is responsible for general processing, including the execution of software stored on the computer-readable medium 1006. The software, when executed by the processor 1004, causes the processing system 1014 to perform the various functions described above for any particular apparatus. The computer-readable medium 1006 may also be used for storing data that is manipulated by the processor 1004 when executing software. The processing system further includes modules 1031, 1032 and 1034. The interference cancellation module 1031 performs interference cancellation on a signal. The categorizing module 1032 categorizes tones of a signal into tone groups. The noise whitening matrix module applies a different noise whitening matrix to each tone group for demodulation and decoding.

The modules may be software modules running in the processor 1004, resident/stored in the computer readable medium 1006, one or more hardware modules coupled to the processor 1004, or some combination thereof. The processing system 1014 may be a component of the UE 650 and may include the memory 660 and/or at least one of the TX processor 668, the RX processor 656, and the controller/processor 659.

In one configuration, the apparatus 102 for wireless communication includes means for categorizing and means for applying. The aforementioned means may be one or more of the modules of the apparatus 100 and/or the processing system 1014 of the apparatus 102 configured to perform the functions recited by the aforementioned means. For example, the categorizing means and the applying means may be the controller/processor 659. In another aspect, the aforementioned means may be any module or any apparatus configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
    performing interference cancellation on a received signal;
    categorizing tones of the received signal into tone groups, the tones being categorized based at least in part on one or more of noise estimates of data channel tones, a time location of the tones, a frequency location of the tones, a metric or any combination thereof; and
    applying a different noise whitening matrix to each tone group for demodulation and decoding of the signal.

2. The method of claim 1, in which the signal comprises serving cell signals and interfering signals.

3. The method of claim 2, in which the interference cancellation is applied to the data channel tones and/or control channel tones of the signal.

4. The method of claim 3, in which the control channel tones include physical data control channel (PDCCH) tones, physical hybrid automatic repeat request indicator channel (PHICH) tones, and/or physical control format indicator channel (PCFICH) tones, and the data channel tones comprise physical downlink shared channel (PDSCH) tones.

5. The method of claim 1, further comprising
    calculating the noise estimate for each data channel tone.

6. The method of claim 1, further comprising
    calculating the metric based on a noise estimate.

7. The method of claim 6, in which the metric comprises soft log-likelihood ratio (LLR) values of the tones.

8. An apparatus for wireless communication, comprising:
    a memory; and
    at least one processor coupled to the memory, the at least one processor being configured:
        to perform interference cancellation on a received signal;
        to categorize tones of the signal into tone groups, the tones being categorized based at least in part on noise estimates of data channel tones, a time location of the tones, a frequency location of the tones, and/or a metric, or a combination thereof; and
        to apply a different noise whitening matrix to each tone group for demodulation and decoding of the signal.

9. The apparatus of claim 8, in which the signal comprises serving cell signals and interfering signal.

10. The apparatus of claim 9, in which the at least one processor performs interference cancellation on the data channel tones and/or control channel tones of the signal.

11. The apparatus of claim 10, in which the control channel tones include:
    physical data control channel (PDCCH) tones, physical hybrid automatic repeat request indicator channel (PHICH) tones, and/or physical control format indicator channel (PCFICH) tones, and the data channel tones comprise physical downlink shared channel (PDSCH) tones.

12. The apparatus of claim 8, in which the at least one processor is further configured:
   to calculate the noise estimate for each data channel tone.

13. The apparatus of claim 8, in which the at least one processor is further configured:
   to calculate the metric based on a noise estimate.

14. The apparatus of claim 13, in which the metric comprises soft log-likelihood ratio (LLR) values of the tones.

15. A computer program product for wireless communication in a wireless network, comprising:
   a non-transitory computer-readable medium having non-transitory program code recorded thereon, the program code comprising:
      program code to perform interference cancellation on a received signal;
      program code to categorize tones of the signal into tone groups, the tones being categorized based at least in part on one or more of noise estimates of data channel tones, a time location of the tones, a frequency location of the tones, a metric or any combination thereof; and
      program code to apply a different noise whitening matrix to each tone group for demodulation and decoding of the signal.

16. An apparatus for wireless communication, comprising:
   means for performing interference cancellation on a received signal;
   means for categorizing tones of a signal into tone groups, the tones being categorized based at least in part on one or more of noise estimates of data channel tones, a time location of the tones, a frequency location of the tones, a metric or any combination thereof; and
   means for applying a different noise whitening matrix to each tone group for demodulation and decoding of the signal.

\* \* \* \* \*